United States Patent
Völker et al.

[11] 3,710,071
[45] Jan. 9, 1973

[54] METHOD FOR PRODUCING FRICTION DISCS

[76] Inventors: Ulrich Völker, Sophienstr. 9c, 2057 Reinbek; Heinz Fabian, Willinghusener Weg 43, 2056 Glinde; Klaus Mertl, Ostlandring 44, 2057 Reinbek, all of Germany

[22] Filed: Sept. 4, 1969

[21] Appl. No.: 855,114

Related U.S. Application Data

[62] Division of Ser. No. 662,707, Aug. 23, 1967, Pat. No. 3,485,331.

[30] Foreign Application Priority Data

Aug. 26, 1966 Germany ........................ J 31642

[52] U.S. Cl. ............................................... 219/93
[51] Int. Cl. .............................................. B23k 11/10
[58] Field of Search ................... 219/93, 94, 118, 117

[56] References Cited

UNITED STATES PATENTS 3,114,030  12/1963  Ruskin ........................... 219/93

*Primary Examiner*—J. V. Truhe
*Assistant Examiner*—J. G. Smith
*Attorney*—Young & Thompson

[57] ABSTRACT

A method for producing friction discs in which a sintered friction lining member is electric resistance welded to a hardened sheet metal support. The lining member is press molded in a recessed mold cavity so as to form on the friction lining member projections corresponding to the recesses. The projections are of less density than the rest of the molded body. Preferably the recesses and projections are bead-like and disposed in lines. The friction lining member is then electric resistance welded to the hardened sheet metal support with pressure so that the projections are flattened and brought back to the same density as the remainder of the friction lining member.

3 Claims, 5 Drawing Figures

METHOD FOR PRODUCING FRICTION DISCS

This application is a division of our copending application Ser. No. 662,707, filed Aug. 23, 1967, now U.S. Pat. No. 3,485,331.

The invention relates to a method for producing a friction disc for brakes and clutches which disc consists of a hardened support plate with sintered friction linings welded thereto.

Support plates provided with friction linings at one or both sides are used where rotary movements have to be transmitted or braked. If the support plates are associated with the rotating parts of the machine, then they are subject to the requirement of minimum possible weight with great strength at the same time. For this reason, very thin sheet steel supports are used, while the friction lining, which is usually organically bonded, that is to say by means of resins or rubber, may even be stuck on in order to save the weight of the rivets as well. The steel plates are usually hardened and tempered in order to achieve a gentle resilient engagement of the clutch or brake and a greater resistance to fatigue phenomena when the plates are subject to distortion. With heavy torques and high speeds, the requirement of acceptable dimensions can only be met by changing over from organically to inorganically bonded friction linings. These inorganically bonded friction linings are produced primarily from powdered metals and metallic oxides by pressing and sintering. The requirements with regard to the support plate remain the same as those already mentioned. It is usual for pressed, or pressed and presintered friction linings to be secured to the steel carrier by pressure sintering.

It is also known to apply the metal powder mixture to the support plate by sprinkling it on for example, and to sinter it thereto without pressure, whereupon further cold pressing generally follows.

Since the support plate is fully annealed during the sintering process, it has to be hardened again afterwards. Thin support plates then have a strong tendency towards distortion.

Conventional methods try to avoid these drawbacks and to produce the support plates from thicker sheet metal in order to compensate for the reduction in strength during the sintering treatment, or sinter the linings onto smaller steel supports which will then be riveted onto the hardened support plates. However, such structures have a much greater weight and hence greater flywheel masses than hardened discs to which the lining has been applied direct, as is done with the adhesion of organically bonded linings to hardened discs.

It is a main object of this invention to obviate the drawbacks of the described conventional friction discs, and of the mentioned methods for producing such discs. Further objects of the invention are: to provide a method by which friction discs can be produced having sintered friction linings secured by welding to thin hardened support plates; and to provide friction discs of excellent strength and elasticity qualities combined with low weight.

According to the inventive method a friction lining blank is produced having on its back to be bonded to the support a pattern of lines which project from the back surface in the form of beads and which extend substantially in the main direction of stress on the friction disc, the density of the lining material in the blank being lower in the volume of the beads and below the bead-like lines than in the remaining material of the blank.

It has been found that application of the friction linings by means of the welding process is only possible if very high welding currents are used for a short time. Depending on the composition of the friction lining blank to be applied, the current density must amount to 10–25,000 A/cm$^2$; the welding time should not exceed 1 second, if possible.

The usual welding process, however, leads to overheating of the friction linings and hence to the formation of hard and brittle precipitates in the structure as a result of local melting zones. Such structures due to overheating lead to undesirable changes in the coefficient of friction and also lead to severe counter attack. Moreover, an increase in the welding time leads to annealing of the sheet metal of the carrier.

Such difficulties are avoided, if the bonding area between lining and carrier plate is kept as small as possible; it is defined by the bead-like raised portions on the friction lining. The proportion of the bonding area preferably amounts to between 10 and 50 percent of the lining area. The bonding area and hence the bead-like lines must be distributed in such a manner—namely in the main direction of stress—that the parts of the applied lining which are more endangered are correspondingly more secured against shearing off and peeling off. This applies above all to the peripheral area of the friction lining, and in particular to the corners when friction segments are applied to hardened support plates.

The friction linings are produced from powder mixtures of the usual compositions for inorganically bonded linings, by pressing and sintering. According to the invention, the pressing tool comprises the required arrangement of the lines in the form of grooves in the bottom of the matrix cavity or in the press die. The charge of the matrix cavity consisting of a conventional inorganic powder mixture, is subject to compression during the pressing step. The compression is lesser in the areas of the grooves than at the other areas of the press due to the fact that the distance between the two parts of the press is greater at the former areas. Hence, at the areas of the grooves, the ready pressed and sintered friction lining blank is in the areas of the bead-like lines of lesser density than in the remaining areas. The requirement that there should be a reduced density below the lines leads to particularly simple pressing tools because homogeneity in the material is only intended to become established during the welding on.

The main stresses for which allowance must be made, on the material of the friction disc are peripheral forces for the transmission of the torque and centrifugal forces during the rotary motion. In the ideal case, the superimposition of the two forces would lead to portions of spiral curves for the lines but the direction of opening and curvature of the spirals would depend on the particular speed and direction of rotation of the friction disc and only in a few applications would they be known already during the production of the friction disc so that they would be determined.

As a particularly favorable arrangement for friction linings in the form of segments, therefore, lines have proved satisfactory which extend in the radial and circumferential direction, substantially parallel to and adjacent to the edge of the friction segment, the resulting area similar to the friction segment being divided up by further lines extending radially and diagonally. The lines extending diagonally over the surface may also be portions of spiral curves. The approximation by means of straight lines is, however, generally sufficient together with the lines extending in the radial and in the circumferential direction, which means a simplification in preparing the pressing tools.

The friction linings are applied to the support plate by resistance welding in a welding press. As a result of the arrangement of the lines according to the invention, the maximum possible area of the hardened support plate is excluded from the heating, and the welding power is reduced to a minimum. The lines melt during the welding and the density of the friction material is homogenized under the action of the welding press. Apart from the regions of the lines there is no reduction in hardness in the support plate.

Further objects and advantages of the invention become apparent from the following disclosure in which a preferred embodiment of the invention is described in connection with the drawings.

Figure 1:
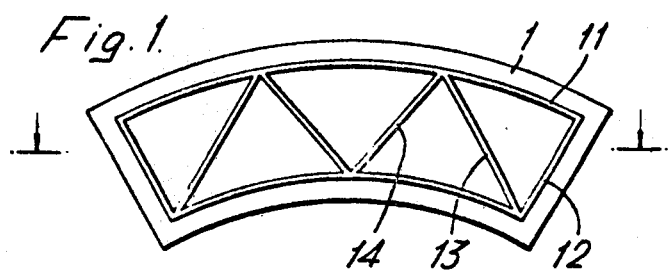
FIG. 1 shows the back of a friction lining blank according to the invention.
Figure 2:
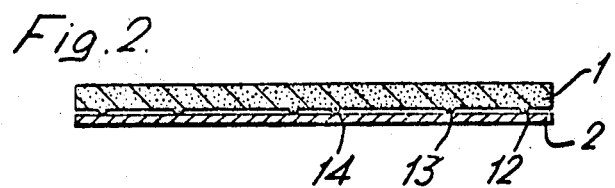
FIG. 2 shows the friction lining blank of FIG. 1 in cross-section on a support plate before the welding.
Figure 3:
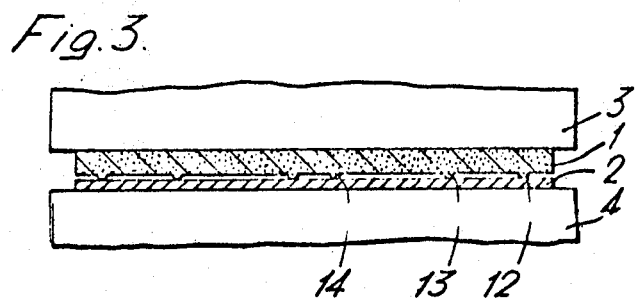
FIG. 3 shows a friction lining blank and a support in a welding press.

With reference to FIGS. 1-3, a friction lining blank 1 is shown which has the shape of a segment with lines 11 through 14 according to the invention produced by compression during pressing and sintering. Lines 11 extend in the circumferential direction, lines 12 in the radial direction and lines 13 and 14 in the diagonal direction. The lines 11 through 14 are formed by beads projecting from the back of the lining blank. The density of the lining blank is, at the areas of the bead-like lines, less than in the remaining areas. In a preferred embodiment, the bonding area formed by the lines amounted to 22 percent of the lining area. A support plate, as part of a friction disc, is designated by 2.

Figure 4:
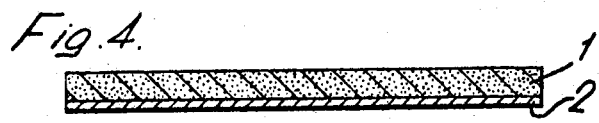
FIG. 4 shows the friction lining welded on to the support plate.
Figure 5:
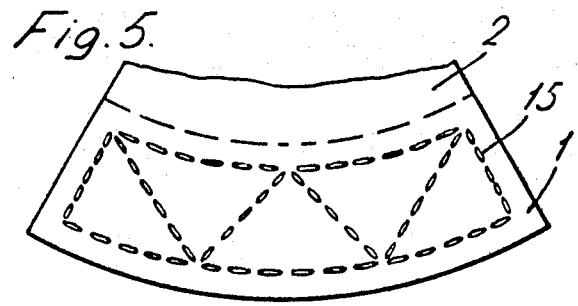
FIG. 5 shows a detail of a friction disc with a friction lining welded on, seen from the side without a friction lining.

In FIG. 3, friction lining blank 1 and support plate 2 can be seen between electrodes 3 and 4 of a welding press. The lining illustrated in FIG. 4 after being welded on has a homogeneous structure throughout. A hardness test on the finished lamination showed no reduction in hardness except at zones 15, FIG. 5 appearing at the back of the support plate after the welding process.

Having described our invention, we claim:

1. A method for producing a friction disc consisting of a hardened sheet metal support and a sintered friction lining member fixedly secured thereto, comprising the steps of press molding a friction lining member in a mold cavity having recesses on one of its inner surfaces, the friction lining member thus having at that side to be applied to the support, a pattern of projections corresponding to said recesses, and thus having lesser density in those parts of its volume which are defined by the projections as compared to the remaining volume, bringing the friction lining member together with the hardened support into an electric resistance welding press with the surface of the friction lining member with the projections against the hardened support, and electric resistance welding while pressing the friction lining member and the hardened support together, thereby to flatten the projections and to compact the material in the areas of these projections to substantially the same density as in the remaining areas of the friction lining member and to weld the friction lining member through said projections to the support.

2. A method as claimed in claim 1, in which said projections are bead-like in cross section.

3. A method as claimed in claim 2, in which said projections are disposed in several lines over the face of the friction lining member.

* * * * *